(12) United States Patent
Alb et al.

(10) Patent No.: US 6,447,005 B2
(45) Date of Patent: Sep. 10, 2002

(54) GAS BAG MODULE

(75) Inventors: Manfred Alb, Iggengen; Geunther Saelzle, Aspach; Marcus Anders, Deggingen, all of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/847,710

(22) Filed: May 2, 2001

(30) Foreign Application Priority Data

May 3, 2000 (DE) ...................... 200 07 930 U

(51) Int. Cl.$^7$ ............................... B60R 21/22
(52) U.S. Cl. ............... 280/730.2; 280/728.2; 280/728.3
(58) Field of Search ............ 280/728.2, 728.3, 280/730.2

(56) References Cited

U.S. PATENT DOCUMENTS

| | | | | |
|---|---|---|---|---|
| 5,628,527 A | * | 5/1997 | Olson et al. ............. | 280/728.1 |
| 6,022,044 A | * | 2/2000 | Cherry .................... | 280/728.2 |
| 6,073,961 A | * | 6/2000 | Bailey et al. ............ | 280/730.2 |
| 6,102,434 A | * | 8/2000 | Ohlert et al. ............ | 280/728.2 |
| 6,209,907 B1 | * | 4/2001 | Fischer ................... | 280/730.2 |
| 6,224,089 B1 | * | 5/2001 | Uchiyama et al. ....... | 280/728.2 |
| 6,296,275 B1 | * | 10/2001 | Schirle .................... | 280/728.2 |

FOREIGN PATENT DOCUMENTS

| | | |
|---|---|---|
| DE | 19813054 | 10/1999 |
| DE | 19815381 | 10/1999 |
| FR | 0957010 | 11/1999 |

* cited by examiner

*Primary Examiner*—Paul N. Dickson
*Assistant Examiner*—Toan To
(74) *Attorney, Agent, or Firm*—Tarolli, Sundheim, Covell, Tummino & Szabo L.L.P.

(57) ABSTRACT

A gas bag module comprises a gas bag, a first ejection channel, in which part of the gas bag is located, and a flexible cover surrounding the gas bag in areas which are not located within the ejection channel. The cover is provided with a tearing line which allows the gas bag to emerge from the cover.

9 Claims, 1 Drawing Sheet

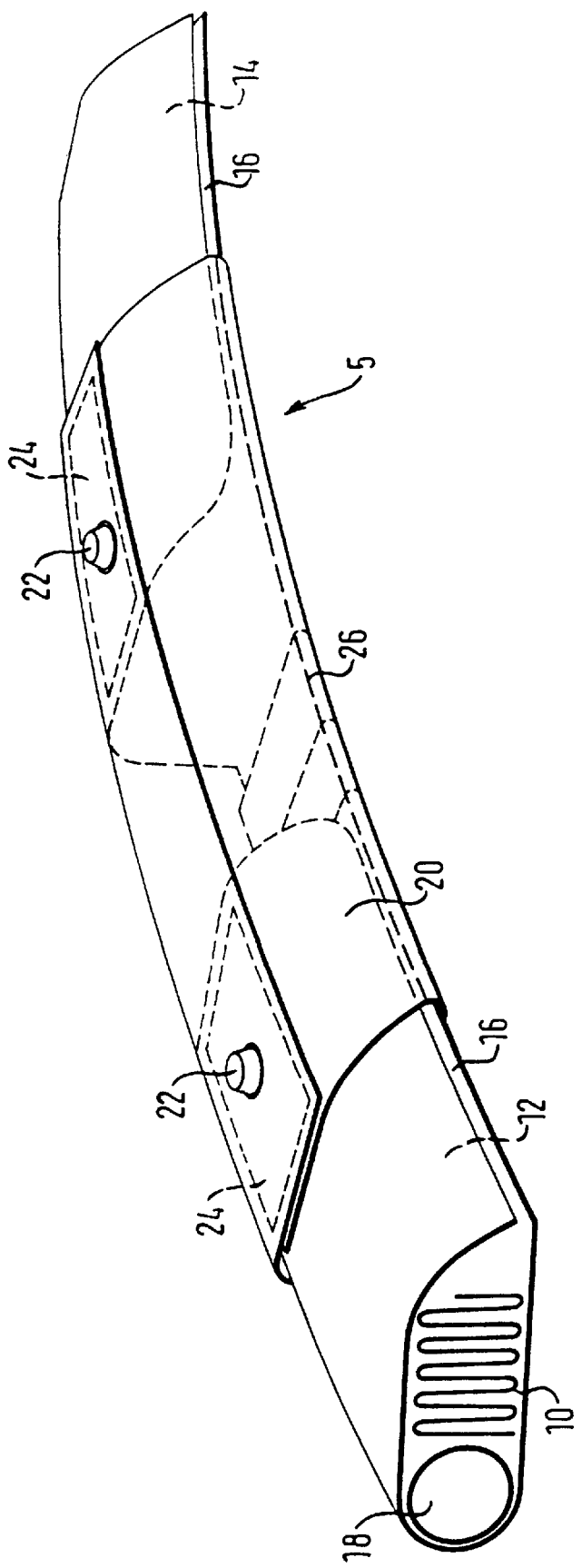

GAS BAG MODULE

BACKGROUND OF THE INVENTION

Conventional gas bag modules comprise a gas bag, at least a first ejection channel, in which part of the gas bag is located, and in some cases a second ejection channel, which is separated from the first ejection channel by a space and in which another part of the gas bag is located. The gas bag of such a gas bag module serves to provide protection for a vehicle occupant, especially in the case of a side-impact collision. For this purpose, the gas bag is unfolded by means of compressed gas that flows into the gas bag after a gas generator has been activated. The ejection channel serves to receive the gas bag before its activation and to influence the unfolding process and the unfolding direction during the activation.

Conventional gas bag modules for a side-impact collision extend from the A-column of the vehicle to the C-column. In this manner, the passengers in the front seat of the car as well as those in the back seat can be protected in case of a side-impact collision. As a consequence, the gas bag module itself is relatively long, up to about 2.5 meters, so that handling problems arise before the assembly. In order to facilitate the handling, two separate ejection channels may be provided, one of which is mounted later, for example, onto the A-column and the other onto the roof edge of the vehicle. During the transportation of the gas bag module, the two ejection channels, along with the gas bag that has already been placed in them, can be folded together from their fully extended arrangement, so that they lie on each other in a space-saving manner. As an alternative to an embodiment with two ejection channels, a single ejection channel may be used with a length which is considerably smaller than the length of the gas bag. The gas bag then protrudes from either one end or from both ends of the ejection channel.

A problematic aspect here is that the gas bag can be damaged both during transportation as such and also by the folding in areas outside the ejection channel or between the two ejection channels.

The objective of the invention is to prevent damage to the gas bag in the area between the two ejection channels.

BRIEF DESCRIPTION OF THE INVENTION

For this purpose, a gas bag module is provided which comprises a gas bag, a first ejection channel, in which part of the gas bag is located, and a flexible cover surrounding the gas bag in areas which are not located within the ejection channel. The cover is provided with a tearing line which allows the gas bag to emerge from the cover. The invention is based on the general notion of using a cover for the parts of the gas bag that are exposed during transportation of the gas bag and assembly in the vehicle, for example, because they protrude from a housing part of the gas bag module and consequently can easily be damaged. The cover especially offers mechanical protection for the gas bag that is exposed in the area between the ejection channels in case two ejection channels are used, so that damage during transportation or due to creasing of the gas bag in this area can be reliably prevented. The material for the cover can fundamentally be any flexible material that offers an adequate mechanical protection for the gas bag. An especially suited material is Tyvek.

Advantageous embodiments of the invention are defined in the sub-claims.

DETAILED DESCRIPTION OF THE INVENTION

The invention is described below with reference to a preferred embodiment that is shown in the single appended drawing. This drawing shows a gas bag module according to the invention in a perspective view.

The gas bag module 5 has a gas bag that is folded up in two ejection channels 12, 14. Each ejection channel has an outlet opening 16 through which the gas bag can emerge from the ejection channels when it is unfolded. In order to unfold, compressed gas flows into it via a gas lance 18 that is shown here in schematic form.

A cover 20 is provided that is attached to the two ejection channels 12, 14 and that extends over the space located between them so that the gas bag extending through the space from one ejection channel to the other ejection channel is covered. The cover consists of a generally square piece of material that is folded in such a way as to form a tube. Each ejection channel 12, 14 is provided with a projection 22 that protrudes through the corresponding openings of the cover 20. Moreover, adhesive sites 24 are provided on which the cover is glued together and attached to the corresponding ejection channel.

On the cover 20, there is a tear line 26 in the form of a perforated line that extends into the extension of the outlet opening 16. The tear line 26 is configured in such a way that it is destroyed when the gas bag unfolds, so that the gas bag can unfold freely.

The term tear line is to be understood to designate any arrangement which allows the gas bag to escape from the cover when the gas bag is unfolded. Instead of a perforated line, the tear line may be formed from a tearing seam, an adhesive connection or any other suitable connection between two plies of the cover.

It is to be noted that the cover may be used also for embodiments of the gas bag module in which a single ejection channel is provided, from which the gas bag protrudes at one end or at both ends. The cover is then attached at one of its ends only and covers the gas bag in the areas outside the ejection channel.

What is claimed is:

1. A gas bag module comprising:
   an inflatable gas bag;
   a gas lance for inflating said inflatable gas bag;
   a first ejection channel and a second ejection channel for receiving said inflatable gas bag and for guiding said gas bag in a predetermined direction upon inflation;
   said second ejection channel being spaced apart from said first ejection channel by a space,
   said gas bag having a section located in each of said first and said second ejection channels and in said space;
   each of said first and second ejection channels comprising a tubular hollow structure with an outlet opening through which said gas bag emerges upon inflation;
   a flexible cover engaging and surrounding said gas bag only in said space to protect said gas bag not located in either of said first and second ejection channels, said cover including a tearing line, said tearing line tearing when said gas bag inflates to allow said gas bag to emerge from said cover.

2. The gas bag module of claim 1, wherein said cover is made of Tyvek.

3. The gas bag module of claim 1, wherein said cover is made of a plastic film.

4. The gas bag module of claim 1, wherein said cover is made of a fabric.

5. The gas bag of claim 1, wherein said tearing line is formed by a perforated line.

6. The gas bag module of claim 1, wherein warning statements are printed onto said cover.

7. A gas bag module comprising a gas bag, a first ejection channel, in which part of said gas bag is located, and a flexible cover surrounding said gas bag in areas which are not located within said ejection channel, said cover being provided with a tearing line which allows said gas bag to emerge from said cover, said ejection channel including an attachment means for said cover.

8. The gas bag module of claim 7, wherein said attachment means is a projection and said cover is provided with an opening through which said projection protrudes.

9. A gas bag module comprising a gas bag, a first ejection channel, in which part of said gas bag is located, and a flexible cover surrounding said gas bag in areas which are not located within said ejection channel, said cover being provided with a tearing line which allows said gas bag to emerge from said cover, said tearing line being formed by a perforated line, wherin said cover is glued to said ejection channel.

* * * * *